United States Patent [19]

Koizumi et al.

[11] 4,429,760
[45] Feb. 7, 1984

[54] REAR-WHEEL SUSPENSION DEVICE FOR A TRICYCLE VEHICLE

[75] Inventors: Shinichi Koizumi, Tokyo; Takeshi Kawaguchi, Saitama; Katsuyoshi Kawasaki, Tokyo, all of Japan

[73] Assignee: Honda Giken Kogyo Kabushiki Kaisha, Tokyo, Japan

[21] Appl. No.: 307,866

[22] Filed: Oct. 2, 1981

[30] Foreign Application Priority Data

Oct. 3, 1980 [JP] Japan ................................ 55-138384
Dec. 19, 1980 [JP] Japan ................................ 55-180168

[51] Int. Cl.³ .......................... B62D 61/08; B62K 5/06
[52] U.S. Cl. ..................................... 180/215; 280/282; 280/284
[58] Field of Search ............... 180/215, 216, 217, 210, 180/211, 212; 280/282, 283, 284

[56] References Cited

U.S. PATENT DOCUMENTS 3,583,727 6/1971 Wallis .............................. 180/215 X
3,931,989 1/1976 Nagamitsu .......................... 280/283

FOREIGN PATENT DOCUMENTS 1482387 4/1967 France ................................ 180/215

*Primary Examiner*—John A. Pekar
*Attorney, Agent, or Firm*—Irving M. Weiner; Pamela S. Burt; John L. Shortley

[57] ABSTRACT

A rear-wheel suspension device on a tricycle vehicle having front and rear vehicle portions interconnected by a rolling joint having a sleeve bearing. To provide increased stability between a pair of rear wheels of the tricycle vehicle, a casing of the rolling joint is pivotably mounted on a frame of the front vehicle portion for pivotable movement. The rolling joint has a spindle connected in a fixed positional relationship relative to axles of the rear wheels. A shock absorber is interposed between the frame and the casing. To increase damping and vibration-isolating ability, the casing is pivotably connected to the frame by a link, and the shock absorber is oriented so as to be substantially perpendicular to a straight line passing through an axis of the rear-wheel axles when they are loaded and a pivot point at which the link is pivotably connected to the casing. The link and the shock absorber have respective longitudinal axes extending substantially parallel to each other, and an engine is oriented such that major vibrations thereof are produced in a direction substantially at a right angle to the aforesaid longitudinal axes.

7 Claims, 6 Drawing Figures

REAR-WHEEL SUSPENSION DEVICE FOR A TRICYCLE VEHICLE

BACKGROUND OF THE INVENTION

1. Field of the Invention

The present invention relates to a rear-wheel suspension device for a vehicle, and more particularly to a rear-wheel suspension device for a tricycle vehicle having a front vehicle portion rollably movable in a lateral vertical plane with respect to a rear vehicle portion.

2. Description of the Prior Art p U.S. Pat. No. 3,931,989, which issued Jan. 13, 1976, discloses a known tricycle vehicle having a front frame supporting a single wheel and a rear frame supporting a pair of wheels, the front frame being tiltable laterally with respect to the rear frame. The front and rear frames are connected by a rolling joint having a sleeve bearing with a sleeve thereof fixed to the front frame. The rolling joint has a shaft supporting the rear frame and is located in axial alignment with the sleeve for angular movement only about its own axis with respect to the sleeve. When the known tricycle runs on a bumpy road, the axles of the rear wheels, supported by swingable arms and moving up and down, constantly change their positional relationship with respect to the longitudinal axis of the shaft, which fact obviously results in poor balance or stability between the rear wheels. Since the shaft of the rolling joint is angularly movable only about its own axis, the rear wheels, in order to damp their jumping movement over bumps on the road, are required to be supported by swingable arms other than the shaft through the medium of a support additionally attached to the shaft. The thus constructed rear frame is complicated in structure, and the shaft and hence the rolling joint should be of high rigidity and large-size because a large bending moment is imposed on the shaft by the rear frame. Further, with the conventional arrangement of the rear frame, the tricycle cannot effectively provide riding comfort because a shock absorber and a rear-wheel supporting arm cannot be positioned for optimum shock absorbing ability, and no suitable structure for reducing engine vibrations is provided.

SUMMARY OF THE INVENTION

The present invention effectively overcomes the foregoing problems attendant known tricycle vehicles having front and rear bodies interconnected by a rolling joint having a sleeve bearing.

According to the present invention, a rear-wheel suspension device on a tricycle vehicle comprises a front frame, a pair of rear wheels, a rolling joint having a casing pivotably mounted on the frame for angular movement in a substantially vertical plane of the vehicle, the rolling joint including a spindle rotatably supported by a bearing in the casing, axles for the rear wheels having a fixed positional relationship with a longitudinal axis of the rolling joint, and a shock absorber interposed between the frame and the casing. The spindle of the rolling joint is rigidly connected at its rear end to a power unit supporting the rear wheels for driving the latter.

The rolling joint is pivotably connected to the frame by a link. The shock absorber has a longitudinal axis extending substantially at a right angle to a straight line passing through a point where the link is pivotably connected to the casing and an axis of the axles when the frame is subjected to the weight of a tricycle rider. The link has a longitudinal axis extending substantially parallel to the longitudinal axis of the shock absorber. The spindle is rigidly connected to a tricycle engine, which is oriented such that it will produce major vibrations in a direction substantially at a right angle to the longitudinal axes of the link and the shock absorber.

Accordingly, it is an object of the present invention to provide a rear-wheel suspension device for a tricycle vehicle having front and rear vehicle portions interconnected by a rolling joint including a sleeve bearing, the rear-wheel suspension device providing increased stability between a pair of rear wheels while the latter are moving up and down, and especially when the rear wheels are brought into contact with the road during jumping movement thereover.

Another object of the present invention is to provide a rear-wheel suspension device for a tricycle vehicle which includes a reduced number of additional parts, and hence is simple in structure, lightweight, and has a rolling joint which is small in size.

Still another object of the present invention is to provide a rear-wheel suspension device which has a sufficient damping performance for a small-size vehicle, isolates engine vibrations to a satisfactory degree, and provides improved riding comfort.

The above and other objects, features and advantages of the present invention will become apparent from the following description when taken in conjunction with the accompanying drawings in which some preferred embodiments of the invention are shown by way of illustrative example.

DETAILED DESCRIPTION OF THE PREFERRED EMBODIMENTS

Figure 1:
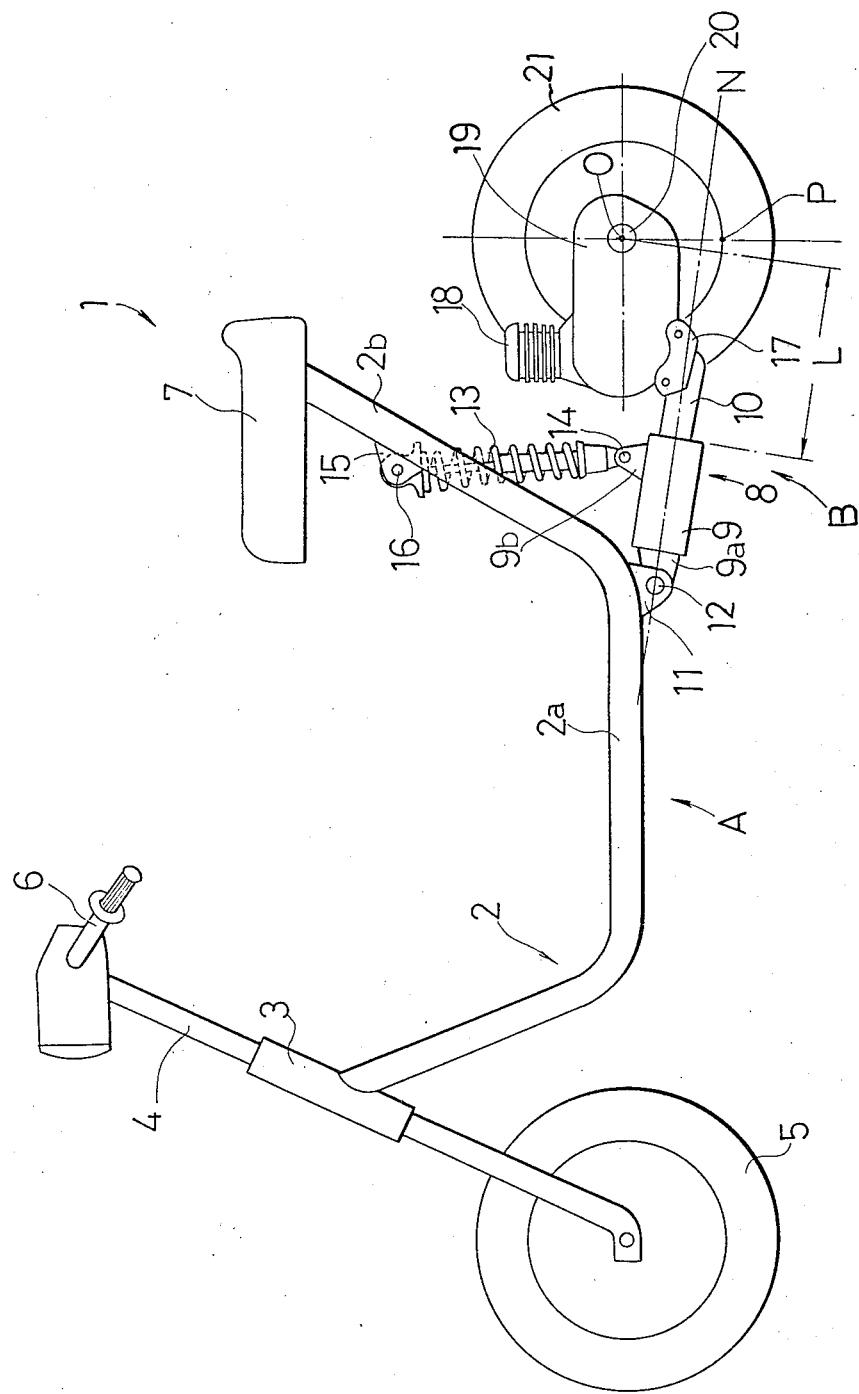
FIG. 1 is a side elevational view of a tricycle vehicle having a rear-wheel suspension device according to the present invention.
Figure 2:
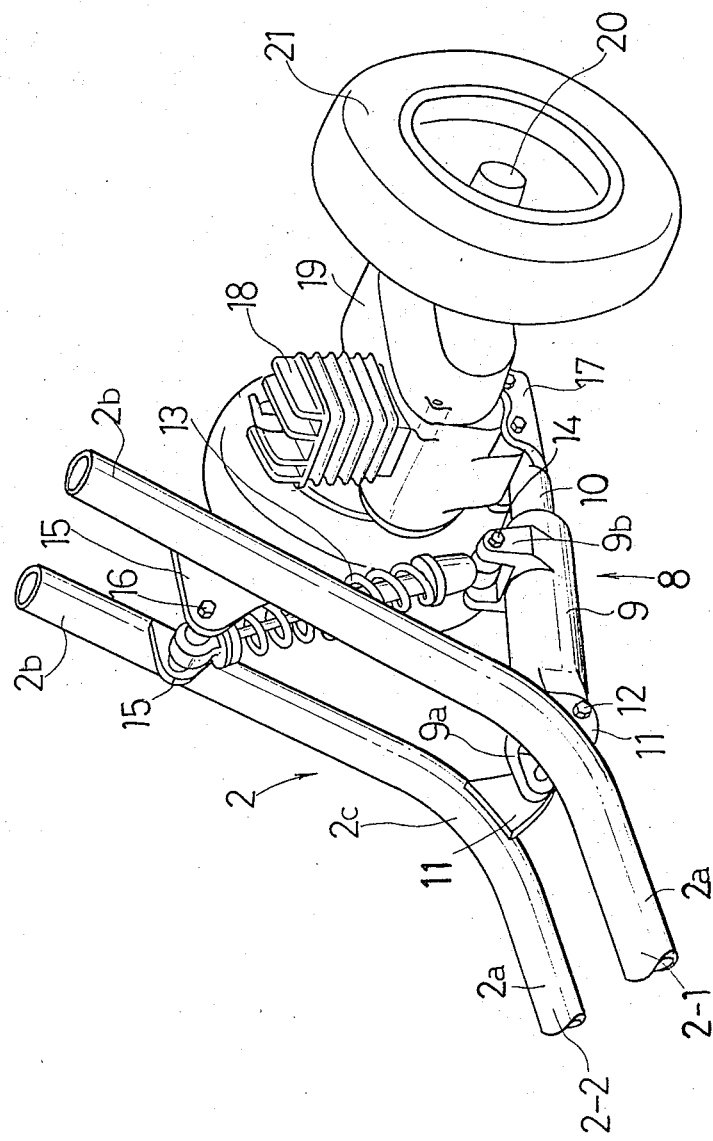
FIG. 2 is a fragmentary enlarged perspective view of the rear-wheel suspension device shown in FIG. 1.

As shown in FIG. 1, a tricycle vehicle 1 comprises a front portion A and a rear portion B, the front portion A including a frame 2 having at a front end thereof a steering head pipe 3 through which rotatably extends a front fork 4 supporting a steerable front wheel 5 on a lower end thereof and a handlebar 6 on an upper end thereof for steering the front wheel 5 through the front fork 4. The frame 2 includes a horizontal bottom portion 2a and an inclined portion 2b extending upwardly and rearwardly from the horizontal bottom portion 2a and serving as a seat post which supports thereon a seat 7 for a rider. As illustrated in FIG. 2, the frame 2 is in the form of a pair of curved tubular members 2-1, 2-2 extending rearwardly from the head pipe 3. The rear portion B of the vehicle 1 comprises a rolling joint 8 rollably movable about its longitudinal axis, an engine 18, and a power unit 19 incorporating a crank case and a power transmission case which houses therein means for transmitting engine power to a pair of rear wheels 21. The rolling joint 8 comprises a cylindrical casing 9 having therein a sleeve bearing, and a spindle 10 rotatably fitted in the cylindrical casing 9. The cylindrical casing 9 has on a front end thereof a pair of spaced brackets 9a disposed between a pair of spaced brackets 11, 11 attached to the tubular members 2-1, 2-2, respectively, at a rear end of the bottom portion 2a of the frame 2, there being a pin 12 extending through the brackets 9a, 11 so as to thus connect the rear vehicle portion B to the front vehicle portion A for up and down pivotable movement with respect to the latter about the pin 12.

A rear cushioning unit 13 such as a hydraulic shock absorber has a lower end pivotably connected by a pin 14 to a pair of spaced brackets 9b formed on a rear end portion of the cylindrical casing 9. The upper end of the rear cushioning unit 13 is pivotably attached by a pin 16 to a pair of spaced brackets 15, 15 mounted respectively on the tubular members 2-1, 2-2 of the rear frame portion 2b located below the seat 7.

The spindle 10 has on a rear end thereof an attachment bracket 17 fastened to the power unit 19 at a front lower side of the latter, the power unit 19 supporting thereon the engine 18 projecting from a front upper side thereof. The power unit 19 includes coaxial axles 20 projecting laterally therefrom and supporting on ends thereof the pair of rear wheels 21, 21 respectively.

As illustrated in FIG. 1, the pivot pin 12 at the front end of the cylindrical casing 9 is arranged at a certain height from the ground such that the axis N of the rolling joint 8 is always inclined rearwardly downwardly at an angle with respect to the horizontal axis of the tricycle vehicle 1 and extends below the axles 20.

The rear wheels 21,21 are movable with the rolling joint 8 up and down about the pivot pin 12, and such movement is absorbed or damped by axial expansion and contraction of the rear cushioning unit 13 interposed between the cylindrical casing 9 and the rear frame portion 2b. As the rear wheels 21, 21 run over a bump on a road while the tricycle vehicle 1 is being driven, the rolling joint 8 is angularly moved to allow up and down movement of the rear wheels 21, 21 with respect to the vehicle frame 2, the rear wheels 21, 21 thus having an enhanced ability to follow bumpy terrain. While the tricycle 1 is travelling on a road, the frame 2 is normally subjected to rolling movement about the spindle 10 through the casing 9. With the axis of the rolling joint 8 inclined rearwardly downwardly, however, the tricycle vehicle 1 can stably be controlled irrespective of such rolling movement of the vehicle frame 2. Integral connection between the rolling joint 8 and the power unit 19 permits the distance between the central axis O of the axles 20 and the point P, where the longitudinal axis N of the rolling joint 8 intersects a vertical line passing through the axis O of the axles 20, to remain unchanged when the rear wheels 21, 21 are moved up and down. Stability between the rear wheels 21, 21 is thus retained regardless of vertical movement of the rear wheels.

With the foregoing arrangement, the distance L between the rear end of the cylindrical casing 9 and the axles 20 is relatively small, which structural arrangement results in a smaller bending moment imposed on the spindle 10 than that experienced with conventional arrangements. The spindle 10 and hence the casing 9 therefor are of a relatively small diameter, small in size, lightweight, and require a small space for installation thereof. With the rear cushioning unit 13 located between the two frame members 2-1, 2-2, the shock absorber, the frame, and various accessary devices can be designed without adversely affecting the overall arrangement of the frame.

Figure 3:
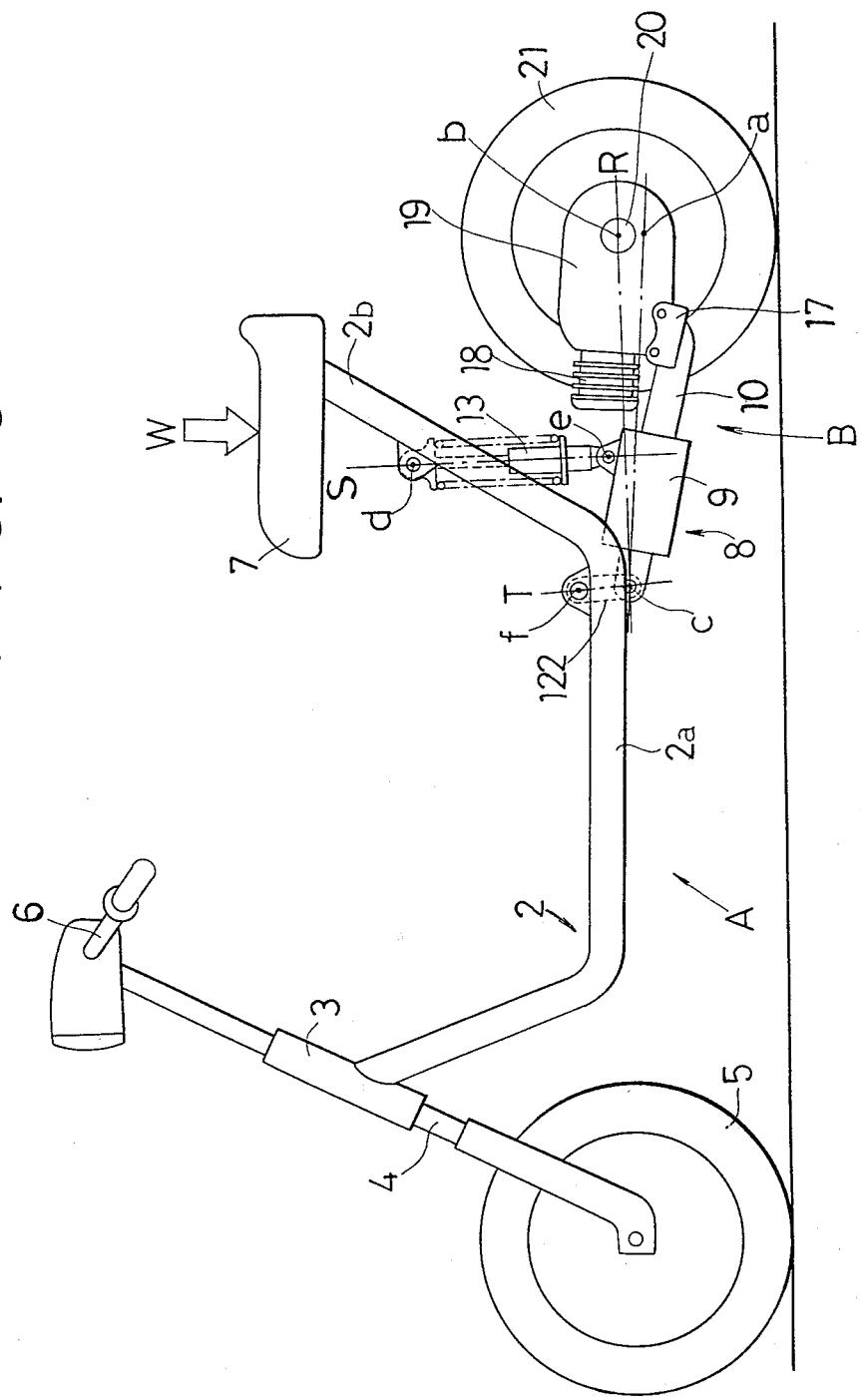
FIG. 3 is a side elevational view of a tricycle vehicle having a rear-wheel suspension device according to another embodiment.
Figure 4:
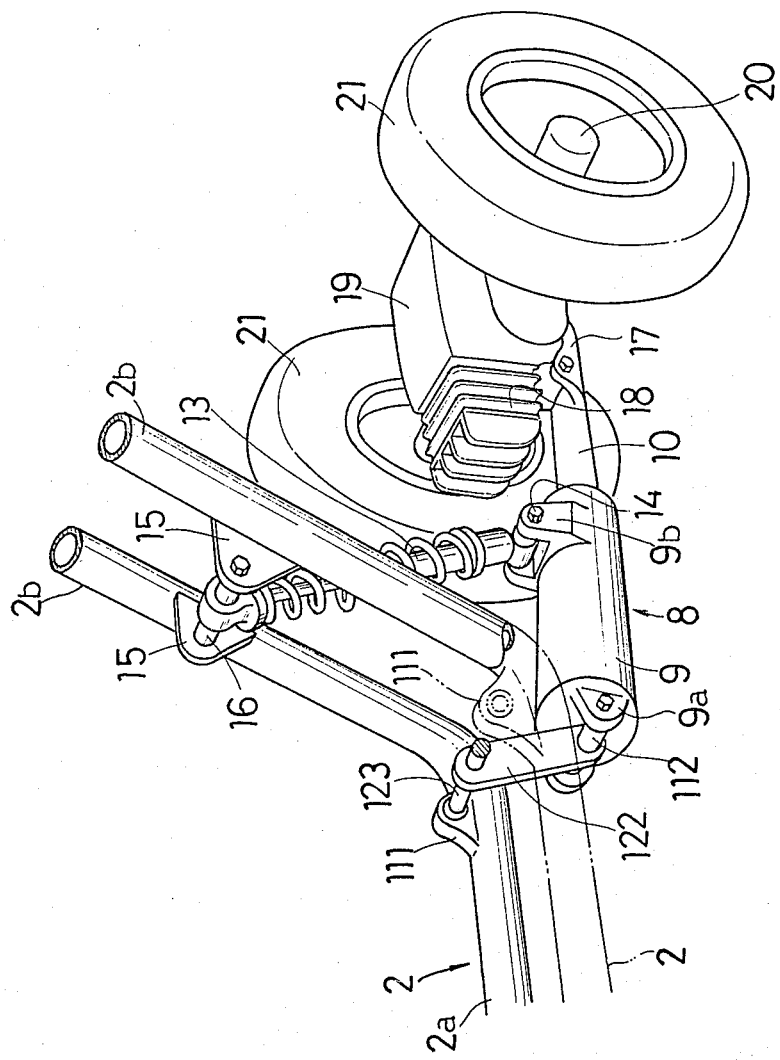
FIG. 4 is a fragmentary enlarged perspective view of the rear-wheel suspension device illustrated in FIG. 3.
Figure 5:
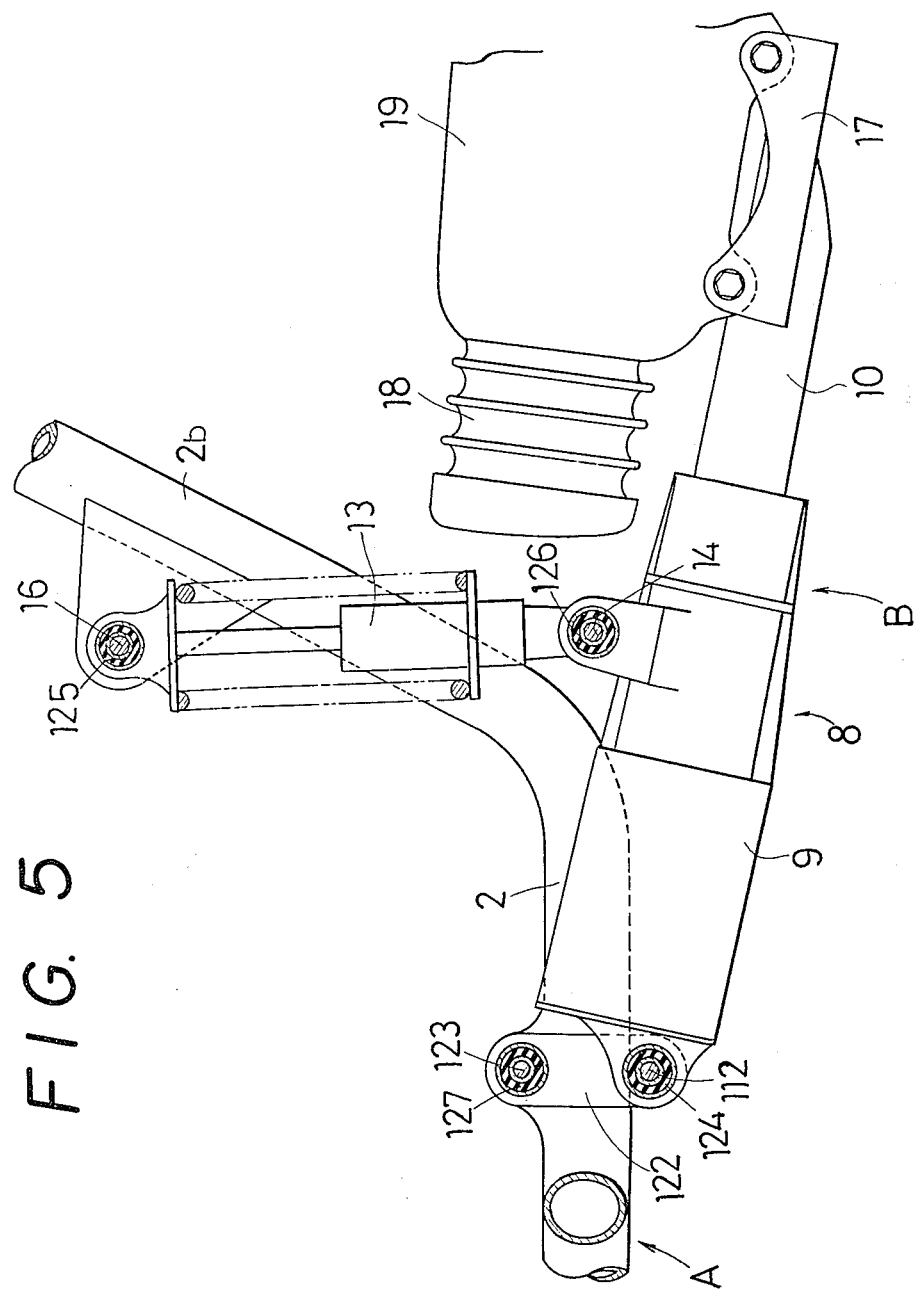
FIG. 5 is a fragmentary enlarged side elevational view, partly in cross section, of the rear-wheel suspension device of FIG. 3.

FIGS. 3 through 5 illustrate another embodiment according to the present invention. Identical parts shown in FIGS. 3 through 5 are denoted by identical reference characters in FIGS. 1 and 2, and those parts which have already been described with reference to FIGS. 1 and 2 will not be described again in detail.

As shown in FIG. 4, a frame 2 has a pair of spaced brackets 111, 111 to which an upper end of a link 122 is pivotably connected by a pin 123 extending between the brackets 111, 111, the link 122 being pivotably connected by a pin 112 to a pair of spaced brackets 9a formed on a front end of a cylindrical casing 9. The link 122 has a substantially vertical axis and allows a rear vehicle portion B to move angularly up and down with respect to a front vehicle portion A. Instead of the single link 122, there may be employed a plurality of links juxtaposed widthwise of the vehicle. As illustrated in FIG. 5, a pair of rubber bushings 127, 124 are disposed respectively around the pins 123, 112, by which the link 122 is pivotably connected to the front and rear vehicle portions A, B, respectively. A rear cushioning unit 13 extends substantially parallel to the longitudinal axis of the link 122 and is connected to the front and rear vehicle portions A, B respectively by a pair of pins 16, 14 surrounded by a pair of rubber bushings 125, 126, respectively.

As described hereinabove, in this embodiment of the invention the front and rear vehicle portions A, B are interconnected by a parallel link mechanism having movable links which are constituted respectively by link 122 and the shock absorber 13, which are angularly movable back and forth.

When a rider sits on the seat 7 and the front vehicle portion A is subjected to the weight W of the rider, the axles 20 for the rear wheels 21 are displaced about a lower pivot point c (FIG. 3) where the rear vehicle portion B is pivotably connected to the link 122 from a point a at which the axles 20 are disposed when no rider is seated on the seat or the vehicle is unloaded to a point b which is located closer than the point a to the seat 7. The points b, c are both disposed on a straight line R. The longitudinal axis of the shock absorber 13 extends through pivot points d, e or the pins 16, 14 and is defined as a straight line S. Pivot points f, c or the pins 123, 112 on the link 122 are connected by a straight line T which extends along the longitudinal axis of the link 122. The shock absorber 13 is disposed such that the lines S, T extend substantially perpendicularly to the line R. With such an arrangement, although the line R is angularly movable about the point c, the variations of angle between the lines S and R are limited to being within a small range, thus allowing the shock absorber 13 to gain a high degree of shock absorption. The points c, d, e and f are subjected almost solely to compressive or tensile loads rather than rotational loads.

Figure 6:
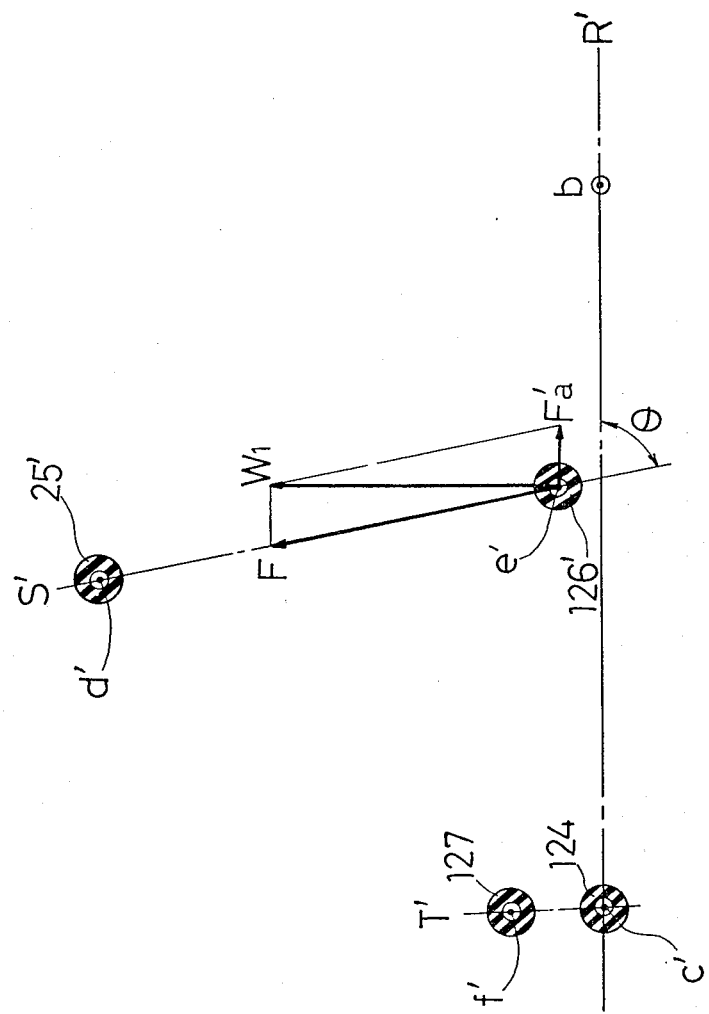
FIG. 6 is a schematic view explanatory of a disadvantage experienced with a rear-wheel suspension device similar to but different than the suspension device shown in FIG. 3.

More specifically, if the shock absorber were oriented with its axial line S' extending at an angle $\theta$ which is not substantially a right angle with respect to a straight line R', the shock absorber would undergo a load F as shown in FIG. 6 when the vehicle is subjected to a reactive load $W_1$ from the road surface. The shock absorber would then produce a damping force directed downwardly along the line S' against the applied load F, the damping force as thus created having a horizontal component F'a which would cause the link and the shock absorber to move angularly. Thus, pivot points c', d', e' and f' on the link and the shock absorber would be subjected to rotational loads, and the rubber bushings 124', 125', 126' and 127' would undergo angular stresses applied about the pivot points c', d', e' and f', respectively. The link and the shock absorber would be angularly moved until the resiliency of the rubber bushings counter-balanced the force component F'a. The rubber bushings 124', 125', 126' and 127' would then be almost continuously in the state of a high spring rate having a decreased resiliency, which would result in a decreased degree of vibration isolation.

Where, on the other hand, the line S extending axially of the shock absorber 13 extends substantially at a right angle to the line R to prevent the horizontal force component F'a from being generated, the pivot points c, d, e and f are subjected to minimized rotational stresses, and the rubber mounts 124, 125, 126 and 127 can thus retain their ability to reduce vibration.

The engine 18 on the rear vehicle portion B may be oriented as desired where only vibrations transmitted from the road surface through the rear vehicle portion B to the front vehicle portion A are to be considered. However, if it is desired to prevent vibrations from being transmitted from the engine 18 it is necessary that the line T extending axially of the link 122 extend substantially parallel to the line S, and that the engine 18 be oriented in the forward direction so that the direction in which the engine 18 produces vibrations is substantially at a right angle to the lines T, S as shown in FIGS. 3–5. With this arrangement, the rubber bushings 124, 125, 126 and 127 can be maintained in the state of a low spring rate having a high resiliency which, combined with the fact that the shock absorber 13 is angularly movable with ease, permits major vibrations from the engine 18 to be effectively absorbed and damped by operation of the parallel link mechanism comprising the link 122 and the shock absorber 13. Thus, engine vibrations are prevented from being transmitted to the front vehicle portion A. Further, because the rubber bushings 124, 125, 126 and 127 operate with a high degree of resiliency, they will have increased durability.

Although certain preferred embodiments of the invention have been shown and described in detail hereinabove, it should be understood that many changes and modifications may be made therein without departing from the scope of the appended claims.

What is claimed is:

1. A rear-wheel suspension device on a tricycle vehicle, comprising:
    front and rear vehicle portions, said front vehicle portion having a frame;
    a pair of rear wheels mounted on said rear vehicle portion by said axles;
    a rolling joint interconnecting said front and rear vehicle portions, said rolling joint including a casing having a sleeve bearing therein and pivotably mounted on said frame for substantially up and down angular movement with respect to said front vehicle portion of said tricycle vehicle, said rolling joint further including a spindle rotatably mounted in said casing, said axles having a fixed positional relationship with a longitudinal axis of said rolling joint; and
    a shock absorber interposed between said frame and said casing.

2. A rear-wheel suspension device according to claim 1, including a power unit supporting said rear wheels for driving said rear wheels through said axles, said spindle being rigidly connected to said power unit.

3. A rear-wheel suspension device according to claim 1 or 2, further comprising:
    a link by which said casing is pivotably connected to said frame, said link having one end thereof pivotably connected to said casing and another end thereof pivotably connected to said frame.

4. A rear-wheel suspension device according to claim 3, wherein said shock absorber has a longitudinal axis extending substantially at a right angle to a straight line passing through a point at which said link is pivotably connected to said casing and an axis of said axles when said frame is subjected to the weight of a tricycle rider.

5. A rear-wheel suspension device according to claim 4, wherein said link has a longitudinal axis extending substantially parallel to said longitudinal axis of said shock absorber.

6. A rear-wheel suspension device on a tricycle vehicle, comprising:
    front and rear vehicle portions said front vehicle portion having a frame;
    a pair of rear wheels mounted on said rear vehicle portion by axles;
    a rolling joint interconnecting said front and rear vehicle portions, said rolling joint including a casing having a sleeve bearing therein and pivotably mounted on said frame for up and down angular movement with respect to said front vehicle portion of said tricycle vehicle, said rolling joint further including a spindle rotatably mounted in said casing, said axles having a fixed positional relationship with a longitudinal axis of said rolling joint;
    a shock absorber interposed between said frame and said casing;
    a link by which said casing is pivotably connected to said frame, said link having one end thereof pivotably connected to said casing and another end thereof pivotably connected to said frame;
    said shock absorber having a longitudinal axis extending substantially at a right angle to a straight line passing through a point at which said link is pivotably connected to said casing and an axis of said axles when said frame is subjected to the weight of a tricycle rider;
    said link having a longitudinal axis extending substantially parallel to said longitudinal axis of said shock absorber; and
    an engine, said spindle being rigidly connected with respect to said engine, and said engine being oriented such that major vibrations therefrom are produced in a direction substantially at a right angle to the longitudinal axes of said link and said shock absorber.

7. A rear-wheel suspension device according to claim 6, further comprising:
    a power unit operatively connected with said engine;
    said power unit supporting said rear wheels for driving said rear wheels through said axles; and
    said spindle being rigidly connected to said power unit.

* * * * *